United States Patent Office 2,951,848
Patented Sept. 6, 1960

2,951,848

BIS(2-PYRROLEMETHYL) DISULFIDE AND ITS N,N'-DIMETHYL DERIVATIVE

Lee Nutting, Berkeley, and Robert M. Silverstein and Chester M. Himel, Menlo Park, Calif., assignors to Hills Bros. Coffee, Inc., San Francisco, Calif., a corporation of California No Drawing. Filed Nov. 4, 1955, Ser. No. 545,134

2 Claims. (Cl. 260—313)

This invention relates to organic compounds and has particular reference to new organic disulfides and their preparation.

This invention has as an object the preparation of new organic compounds. A further object is the preparation of a new class of organic disulfides. Yet another object of this invention is the preparation of a new class of compounds, consisting of bis-heterocyclic disulfides wherein the hetero-atom is nitrogen.

Other objects and advantages of this invention it is believed will be readily apparent from the following detailed description of preferred embodiments thereof.

These and other objects are accomplished by the following invention wherein heterocyclic mercaptans are oxidized and wherein heterocyclic aldehydes are reacted with ammonium sulfides, the resulting reaction products being new compounds generically defined as bis-heterocyclic compounds wherein the hetero-atom is nitrogen and wherein the two heterocyclic nuclei are linked together by a substituent having the general formula —R—S—S—R'—, where R and R' are alkylene radicals, either the same or different, each substituted on a nuclear carbon atom.

The invention is illustrated by the following examples:

EXAMPLE 1

*Bis-(2-pyridylmethyl) disulfide*

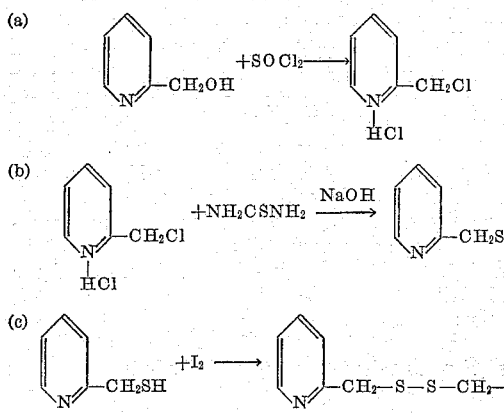

a. To 5.0 g. of 2-pyridyl carbinol in 30 ml. of ether, stirred and cooled in an ice bath, was added 10 ml. of thionyl chloride in 15 ml. of ether. After 0.5 hour, the ether and excess thionyl chloride were removed with a water pump leaving a solid residue.

b. The above residue was refluxed for one hour with 4.4 g. of thiourea in 30 ml. of 95% ethanol. A solution of 5.0 g. of sodium hydroxide in 20 ml. of water was added, and refluxing was continued for one hour. The solution was neutralized with carbon dioxide and extracted with ether. The residue from the ether solution was distilled at 10 mm. at a head temperature of 87–89° C. The distillate (2-pyridylmethyl mercaptan) weighed 3.2 g., and gave the following analytical values:

|  | Calculated, Percent | Found, Percent |
| --- | --- | --- |
| Carbon | 57.6 | 57.5 |
| Hydrogen | 5.52 | 5.64 |
| Sulfur | 25.6 | 25.0 | c. To a solution of 0.5 g. of 2-pyridylmethyl mercaptan in 10 ml. of chloroform was added 0.27 g. of iodine. The mixture was shaken at room temperature for one hour, and the precipitate was filtered. The precipitate was shaken with sodium hydroxide solution and extracted with chloroform. The residue, impure bis-(2-pyridylmethyl) disulfide, was purified by dissolving in ether, passing in hydrogen chloride, and recrystallizing the hydrochloride. The compound was regenerated by shaking with alkali, and extracting with ether. The ether residue, a pale yellow viscous oil, was crystallized to provide a product having a melting point of 38.5–39.5° C. and the following analytical values:

|  | Calculated, Percent | Found, Percent |
| --- | --- | --- |
| Carbon | 58.0 | 57.0 |
| Hydrogen | 4.84 | 4.93 |
| Sulfur | 25.8 | 25.8 |

Other oxidizing agents than iodine, such as, for example, ferric chloride, lead peroxide, hydrogen peroxide, and copper sulfate, may be used for the oxidation of the mercaptan compounds.

EXAMPLE 2

*Bis-(2-pyrrolemethyl) disulfide*

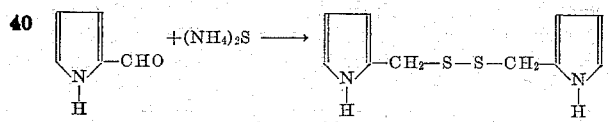

To 30 ml. of an alcoholic solution of ammonium sulfide prepared as in the previous synthesis was added 1.0 g. of 2-pyrrolealdehyde. After two days at room temperature, the solution was diluted with water and extracted with ether. The residue from the ether solution was recrystallized from aqueous ethanol to give a product melting at 66–67° C. The following analytical values were determined:

|  | Calculated, Percent | Found, Percent |
| --- | --- | --- |
| Carbon | 53.5 | 53.6 |
| Hydrogen | 5.40 | 5.50 |

EXAMPLE 3

*Bis-(N-methyl-2-pyrrolemethyl) disulfide*

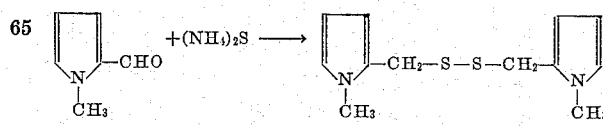

N-methyl-2-pyrrolealdehyde was treated with ammonium sulfide in the same manner as was 2-pyrrolealdehyde in the previous preparation. Recrystallization from petroleum ether (B.P. 65–110° C.) gave a product melting at 86–87° C. with the following analytical values:

|  | Calculated, Percent | Found, Percent |
|---|---|---|
| Carbon | 57.2 | 57.4 |
| Hydrogen | 6.34 | 6.37 |

While in the specific examples set forth above the substituent —R—S—S—R'— is substituted on nuclear carbon atoms at position 2, such substitution may also take place at position 3 in the case of five-membered heterocyclic nuclei and also at positions 3 and 4 in the case of six-membered heterocyclic nuclei. Moreover, the heterocyclic nuclei may contain on nuclear carbons organic residue substituents in addition to the

—R—S—S—R'— substituents. Examples of symmetrical compounds containing such additional substituents are:

*Bis-(2-methyl-4-pyridylmethyl) disulfide*

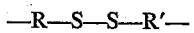

*Bis-2-(3-methyl-5-ethyl 3-pyrrolethyl) disulfide*

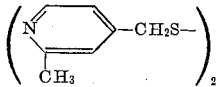

*Bis-(N-methyl-3,5-diphenyl 2-pyrrolemethyl) disulfide*

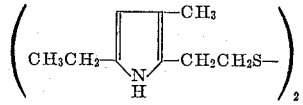

This invention is not limited to symmetrical compounds, i.e., those in which the two heterocyclic members are the same, but comprehends within its scope unsymmetrical compounds in which the two N-hetero-atom-containing heterocyclic members are different, and those in which the members are the same but differ in respect to substituents other than the —R—S—S—R'— substituent, such as, for example:

*2-pyrrolemethyl N-methyl 2-pyrrolemethyl disulfide*

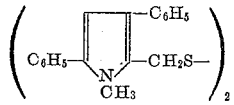

*N-methyl-2-pyrrolemethyl 2-pyridylmethyl disulfide*

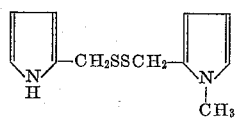

Additionally, the invention includes compounds which are unsymmetrical from the standpoint that the substitution of the —R—S—S—R'— substituent occurs on position 2 on one heterocyclic member and on position 3 or 4 on the other heterocyclic member, or on position 3 on one six-membered heterocyclic member and position 4 on the other.

As used herein, the term "alkylene" is intended to cover both unsubstituted and substituted alkylene groups, such as, for example:

*(2-pyridyl)methyl 3-(2-pyridyl)propyl disulfide*

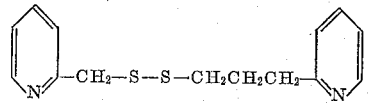

*(2-pyrrole)methyl 2-methyl-2-(5-methyl-2-pyrrole)ethyl disulfide*

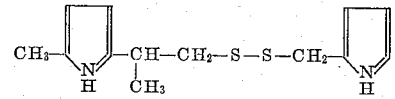

The new compounds of this invention are particularly useful as flavoring agents for foods and beverages. For example, 1 part by weight of each of the following compounds: bis-(2-pyrrolemethyl) disulfide; bis-(3-indolemethyl) disulfide (disclosed in our copending application Serial No. 525,354, filed July 29, 1955, now abandoned, entitled Condensed Ring Heterocyclic Disulfides); bis-(3-indolemethyl) sulfide (disclosed in our copending application Serial No. 525,353, filed July 29, 1955, now abandoned, entitled Heterocyclic Sulfides and Their Preparation); bis-2-furfuryl sulfide (also disclosed in said copending application Serial No. 525,353); 2-furfuryl isothiocyanate (disclosed in our copending application Serial No. 525,355, filed July 29, 1955, now Patent No. 2,905,701, entitled Heterocyclic Isothiocyanates and Their Preparation); 2-thenyl isothiocyanate (also disclosed in said copending application Serial No. 525,355); comprising a total of 100 mg. was dissolved in 900 mg. of a solvent such as furfuryl alcohol. Portions of this solution may be directly added to a prepared cereal-based beverage such as "Instant Postum" to enhance the flavor thereof, or similar results may be obtained by incorporating the flavoring agent during the manufacture of the cereal-based beverage concentrate, such as by adding it to the liquid material prior to the final drying step. For example, when flavoring the prepared cereal-based beverage 12 mg. of the furfuryl alcohol solution are added to 100 cc. of beverage containing 1.5% soluble and dispersible solids. When using the furfuryl alcohol solution in the manufacture of the cereal-based beverage concentrate, about 1 oz. of the furfuryl and alcohol solution is used for each 8 lbs. of the final dried product. In either case, a beverage especially acceptable to some tastes may be obtained by adjusting the pH to about 5 by the addition of citric acid or the like.

Having fully described our invention, it is to be understood that we do not wish to be limited to the details set forth, but our invention is of the full scope of the appended claims.

We claim:
1. Bis-(2-pyrrolemethyl) disulfide.
2. Bis-(N-methyl-2-pyrrolemethyl) disulfide.

No references cited.